(12) United States Patent  (10) Patent No.: US 8,999,166 B1
Torres-Collazo  (45) Date of Patent: Apr. 7, 2015

(54) TANK ACCESS HATCH AND CLEANING METHOD

(71) Applicant: Angel Torres-Collazo, Caguas, PR (US)

(72) Inventor: Angel Torres-Collazo, Caguas, PR (US)

( * ) Notice: Subject to any disclaimer, the term of this patent is extended or adjusted under 35 U.S.C. 154(b) by 0 days.

(21) Appl. No.: 14/082,111

(22) Filed: Nov. 16, 2013

Related U.S. Application Data

(60) Provisional application No. 61/727,736, filed on Nov. 18, 2012.

(51) Int. Cl.
*C02F 3/06* (2006.01)
*E02D 29/12* (2006.01)
*B01D 24/46* (2006.01)
*B01D 29/62* (2006.01)

(52) U.S. Cl.
CPC ............. *E02D 29/12* (2013.01); *B01D 24/46* (2013.01); *B01D 29/62* (2013.01); *C02F 2203/006* (2013.01); *C02F 3/06* (2013.01); *B01D 2201/31* (2013.01)

(58) Field of Classification Search
CPC .... B01D 24/26; B01D 29/62; B01D 2201/31; B01D 24/46; C02F 3/04; C02F 3/06; C02F 2203/006; E02D 29/12

USPC .......... 210/615, 617, 618, 791, 792, 85, 150, 210/151, 232, 281
See application file for complete search history.

(56) References Cited

U.S. PATENT DOCUMENTS

| | | | |
|---|---|---|---|
| 1,769,388 A * | 7/1930 | Prentice | 210/281 |
| 4,335,740 A * | 6/1982 | Boley | 52/20 |
| 4,391,703 A * | 7/1983 | Crosby | 210/151 |
| 4,634,534 A * | 1/1987 | Cominetta et al. | 210/150 |
| 5,190,646 A * | 3/1993 | Hattori et al. | 210/151 |
| 5,282,339 A * | 2/1994 | Devlin et al. | 52/20 |
| 5,294,337 A * | 3/1994 | Johnson | 210/281 |
| 5,527,454 A * | 6/1996 | Ponte et al. | 210/151 |
| 2004/0149651 A1 * | 8/2004 | Ruppel | 210/150 |
| 2006/0231509 A1 * | 10/2006 | Marzett | 210/791 |
| 2010/0193433 A1 * | 8/2010 | Hausin et al. | 210/150 |

* cited by examiner

*Primary Examiner* — Christopher Upton
(74) *Attorney, Agent, or Firm* — Luis Figarella

(57) ABSTRACT

A specially designed hatch apparatus and method for entry to a water treatment chamber containing media for water treatment. The hatch's shape, specially embodied hatch/media gap seal and position allows normal chamber operation and access to the lower chamber cavity for cleaning and maintenance time through treatment media.

1 Claim, 5 Drawing Sheets

TANK ACCESS HATCH AND CLEANING METHOD

CROSS-REFERENCE TO RELATED APPLICATIONS

This application claims priority to U.S. Provisional patent application Ser. No. 61/727,736 titled "Tank Access Hatch", filed on Nov. 18, 2012 the disclosure of which is herein incorporated by reference in its entirety.

PATENTS CITED

The following documents and references are incorporated by reference in their entirety, Krichten et al (U.S. Pat. No. 7,591,610), Kulick, III et al (U.S. Pat. No. 7,731,842).

FIELD OF THE INVENTION

The present invention relates to access to water drain tank or channel modules and in particular to specific design modification and enhancements system, methods and apparatus that would allow easy access to them for maintenance purposes.

DESCRIPTION OF THE RELATED ART

The identification of harmful environmental conditions created by nitrogen rich wastewater treatment plant effluents in rivers and estuarial environments has generated evolutional changes in the treatment processes for municipal and industrial wastewater. The above has created the deployment of baffle chambers, Trickling Filters, Tube Settlers, Plate Settlers, Storm water Management, Integrated Fixed Film/Activated Sludge [IFAS], and others. More have evolved due to and subsequent and necessary regulatory changes required to protect the environment.

Many of these devices control the runoff of water from natural runoff areas, as well as construction sites, and other locations, where such runoff otherwise may cause a problem with respect to overflow areas, silt build-up and the like. Such modules, alone or together as an assembly, restrict the entry of sediment into the modules or assembly and control the retention of soil abutting them when they are installed in a trench or otherwise underground.

The two major problems with the present system installations, is that with many of these system access to the space below the media, as well as space to clean while there, is severely limited. In many installations, the area of the media used to separate the solids is maximized, leaving little or no space for humans to access the space below the media. In addition, in many cases the air diffuser or lower chamber space has little headroom. This forces the removal of the media, risking its breakage which necessitates its replacement. What is needed is an easy way to access the bottom of the media without compromising its effectiveness.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about an apparatus for allowing access to the bottom of a water treatment chamber filled with water filtration media, said apparatus comprising a hatch formed of an impermeable material, shaped to allow travel through it by a human, said hatch extends from above the operational water level of said chamber to a level significantly below the top of said media and an opening of dimensions significantly similar to those of said hatch extends through said media into the lower chamber cavity. In another aspect, a gap seal is formed around the external periphery of said hatch, preventing the flow of water in the area between the hatch and the media, said gap seal being located significantly below the top of said media. In yet another aspect, a ladder extends inside said hatch from above said operational water level to said lower chamber cavity, and a lid is placed on top of said hatch.

In one aspect, said hatch extends to the bottom of said media. In another aspect a gap seal is formed around the external periphery of said hatch, preventing the flow of water in the area between the hatch and the media, said gap seal being located significantly below the top of said media. In yet another aspect, a ladder extends inside said hatch from above said operational water level to said lower chamber cavity and a lid is placed on top of said hatch. In one aspect, the gap space between the external periphery of said hatch and the media is kept to half of the normal gap within said media, presenting to the flow of water in the area between the hatch and the media a situation similar to that presented by the media. In yet another aspect, said hatch extends to the bottom of said media. In another aspect a ladder extends inside said hatch from above said operational water level to said lower chamber cavity, and a lid is placed on top of said hatch.

In one aspect, the invention is about a method for allowing access to the bottom of a water treatment chamber filled with water filtration media, said method comprising entering a hatch formed of an impermeable material, said had shaped to allow travel through it by a human, wherein said hatch extends from above the operational water level of said chamber to a level significantly below the top of said media, travelling through said opening of dimensions significantly similar to those of said hatch extending through said media into the lower chamber cavity and cleaning said media from below.

Other features and advantages of the present invention will become apparent upon examining the following detailed description of an embodiment thereof, taken in conjunction with the attached drawings.

Figure 1A:
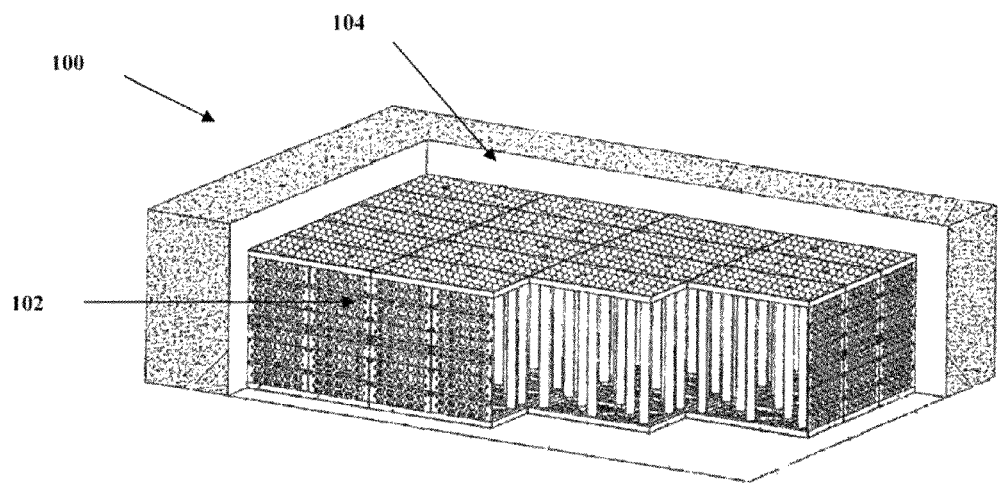
FIGS. 1A-1C illustrate various waste water treatment plants prior art.

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Figure 1B:
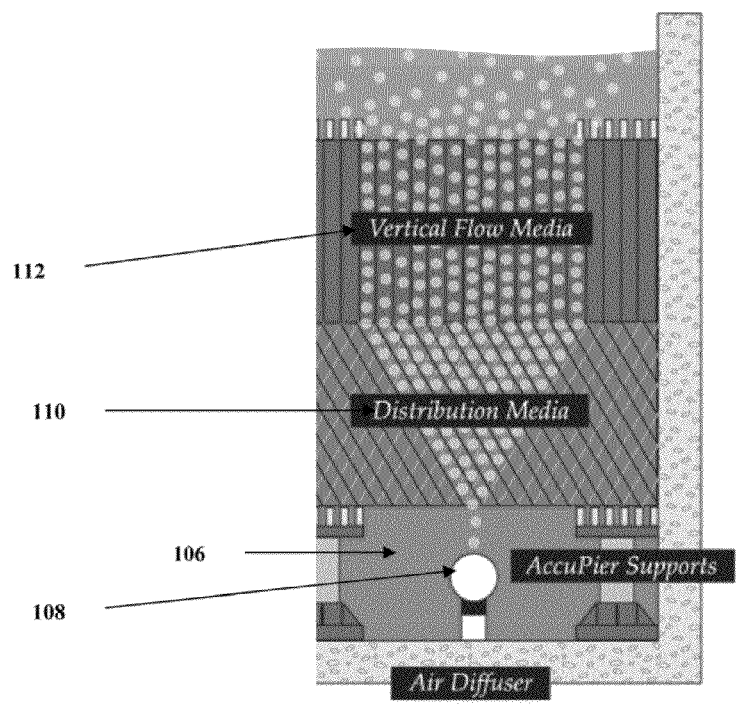
Figure 1C:
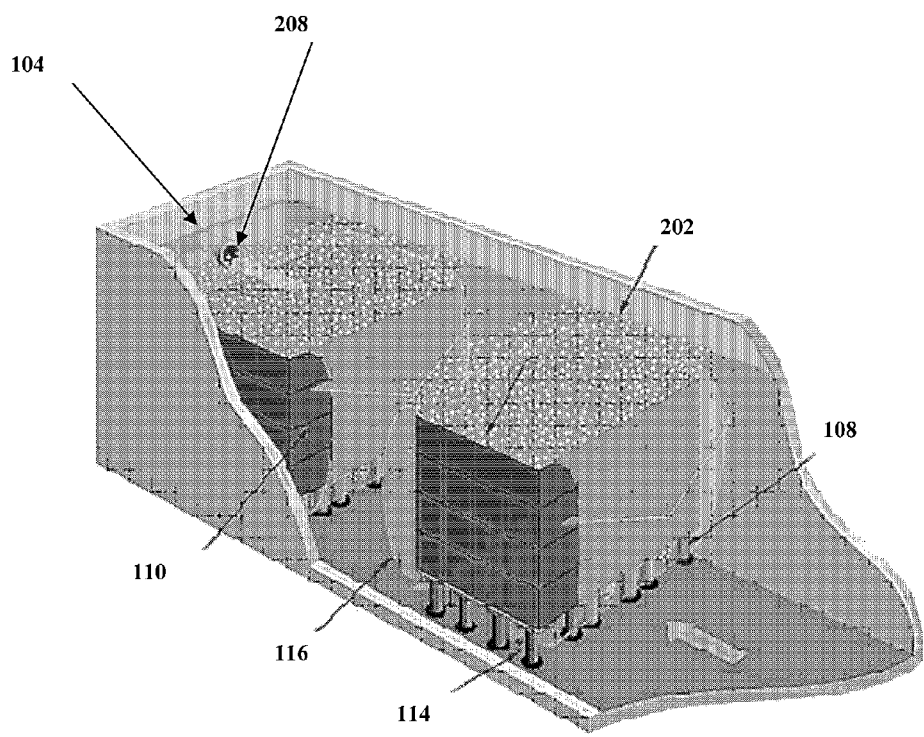

Referring to FIGS. 1A-1C, we see the prior art of a number of chambers 100 used for water treatment of either clean water with significant sediment, or waste water. In some cases, as those seen in FIGS. 1A-1C, these include a module adapted to be buried in an appropriate location in the ground forming a chamber 104 within which a filtering material 102 is placed. In one embodiment, the water action pass through the chamber and the filtering material, creates a set of flues within which the sediment is trapped, resulting in a clearer fluid exciting the chamber.

In some embodiments (FIG. 1B), the process is helped by the addition of an aerator 108, placed within the lower chamber 106 cavity formed between the bottom of said media and above the bottom of said chamber, where the water enters the chamber 104. The fluid (be it water or otherwise) then passes through water filtration or treatment media 110, including horizontal and/or vertical flow media shapes 112 that helps the solids remain behind. The isometric view FIG. 1C shows an isometric cutaway view of the chamber 104 showing the distributed airlift pumping 202, the air diffusers 108, the supports posts 114, the recirculating fluid flow 116 through the media 110.

Figure 2:
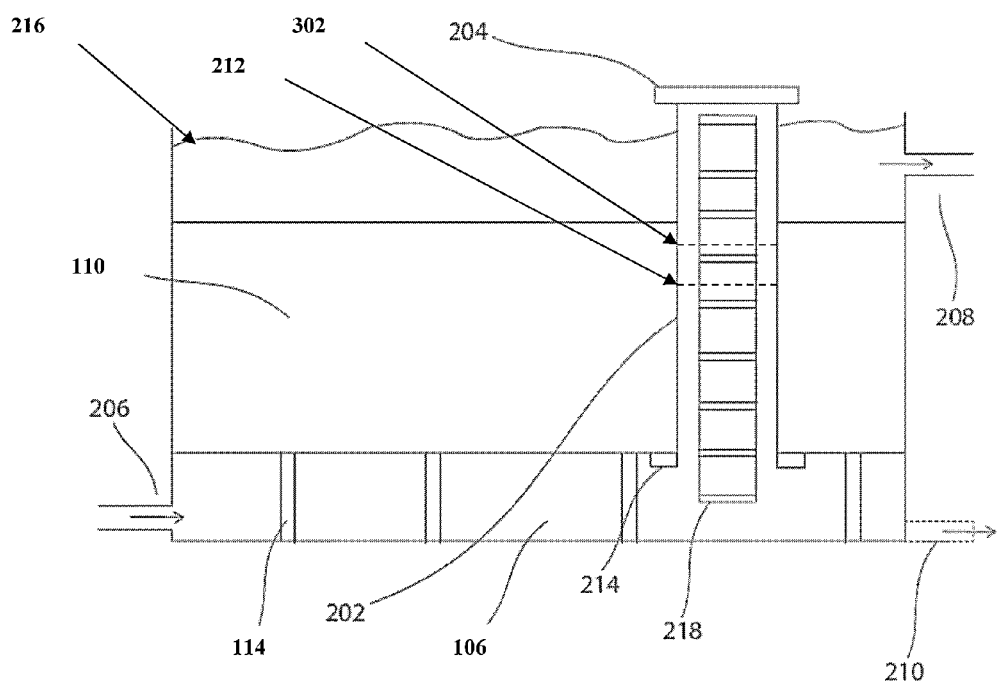
FIG. 2 contains a cross sectional representative implementation of the hatch system, according to an exemplary embodiment of the invention.

Referring to FIG. 2, we see that in one embodiment, the water enters through an opening 206 from the exterior and below the water surface. This entry reduces any disturbance, and allows the heaviest elements in suspension in the fluid to fall into the lower chamber cavity or opening 106. In addition, gravity allows any other heavy pieces caught in media 110 openings to remain trapped there, or fall into the lower cavity 106. After flowing through the media 110, the exit for the fluid while in operation is located above the media 110 through one or more openings 208 at/near the top of the chamber, forcing the water to flow upwards through the media or filtering material 110.

In one embodiment, said filtering material 110 is usually constructed of PVC structured-sheet media, sometimes called 'chevrons' in the field. Such materials add fixed-growth surface for bio-mass to provide increased biological primary or secondary treatment capacity (BOD, ammonia, or total nitrogen-removal) in a simple yet robust solution. The media is typically supported above the floor of the chamber 104 by support posts 114, forming a space for a sub-chamber or supports sub chamber 106 below the media. Typically, to avoid the water 'sneaking' through the filters, the complete chamber is covered by the flow media 110, although in other embodiments support posts 114 for media columns 110 that create a sub-chamber 106 may be used.

As particles deposit and adhere, regularly the media 110 and chamber 104 must be cleaned. In many cases, a flushing opening 210 within the supports volume or sub-chamber 106 allows for the sediment to be taken out through flushing. However, this area is difficult to reach, often has no space for a human to move comfortably and in most cases is only reached through the removal of the media 110. Such a removal results often in breakage of the media 110, necessitating its replacement.

In one embodiment, the invention comprises the adaptation of an access tube, opening, channel or hatch 202 having a cover or lid 204 and an optional integral ladder 218 through the media 110 from the top of the fluid level to the supports sub-chamber 106. The lid 204 is shaped to cover the hatch opening, although it is not designed to have an airtight seal around the hatch 202 entry. This is so that the water level inside the hatch 202 is allowed to match that of the water outside it (reducing any possible pressure). In one embodiment, the lid 204 is permanently hinged to the hatch 202 opening, to eliminate the risk of it being dislodged accidentally and lost.

The hatch 202 provides a path for an operator to enter the supports sub-chamber cavity 106 without necessitating the removal of any media or chevrons 110. In some cases, the raising of the treatment media 110 above the chamber floor in order to create a sub-chamber cavity 106 could be accomplished, particularly in order to raise the height of the sub-chamber cavity 106 so that raising allows for the comfortable crawling within the space of a human having cleaning equipment and/or trailing a hose through the hatch 202.

While a rectangular hatch 202 is illustrated, the hatch may be of any suitable shape, including circular, ovoid, rectangular, etc., as long as a human of normal size can travel down its interior. The hatch 202 may be formed from any combination of impermeable materials, preferably those capable of sustaining prolonged exposure to water and the solids within it. The above include both ferrous and non-ferrous metals (steel, stainless steel, aluminum alloys, etc.), as well as composites such as carbon fibers, and thermo-formed plastics, including either thermoplastic or thermosetting polymers (examples of these include polyethylene, polystyrene, polyvinyl chloride, polypropylene and polytetrafluoroethylene (PTFE)), including materials such as nylon, Plexiglas, and others.

In this fashion, the cleaning of the chamber 104 and the media 110 within it may be accomplished without removing any media 110, as long as the water and detritus loosened by the cleaning operator within the chamber is flushed to the sub-chamber 106 and outside via the cleaning flushing opening 210.

In one embodiment, it is sufficient to have the hatch extend from above the chamber's intended operational water level 216, to a point below the water line and sufficiently within the media (212) to ensure the seal gap 302 is significantly above it (say 15 cm or more). In an alternate embodiment, the hatch 202 extends completely below the media 110 and has an overhang or lip 214 that would extend around the base of said hatch 202 to ensure that the water from the bottom could not get to the top without traveling through the filtering media 110. In an alternate embodiment, a ladder 218 or other such climbing conveyance is located within the chamber (although it may be removable) for the operator to climb down to the sub-chamber 102.

Figure 3:
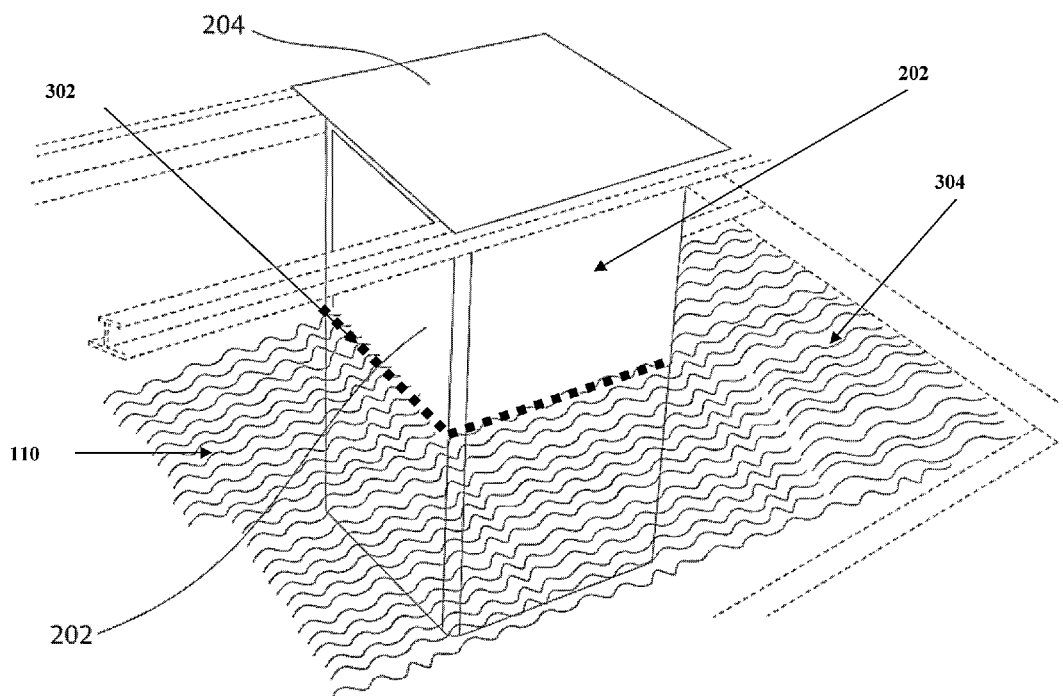
FIG. 3 contains an isometric view of a representative implementation of the hatch system, according to an exemplary embodiment of the invention.
Figure 4:
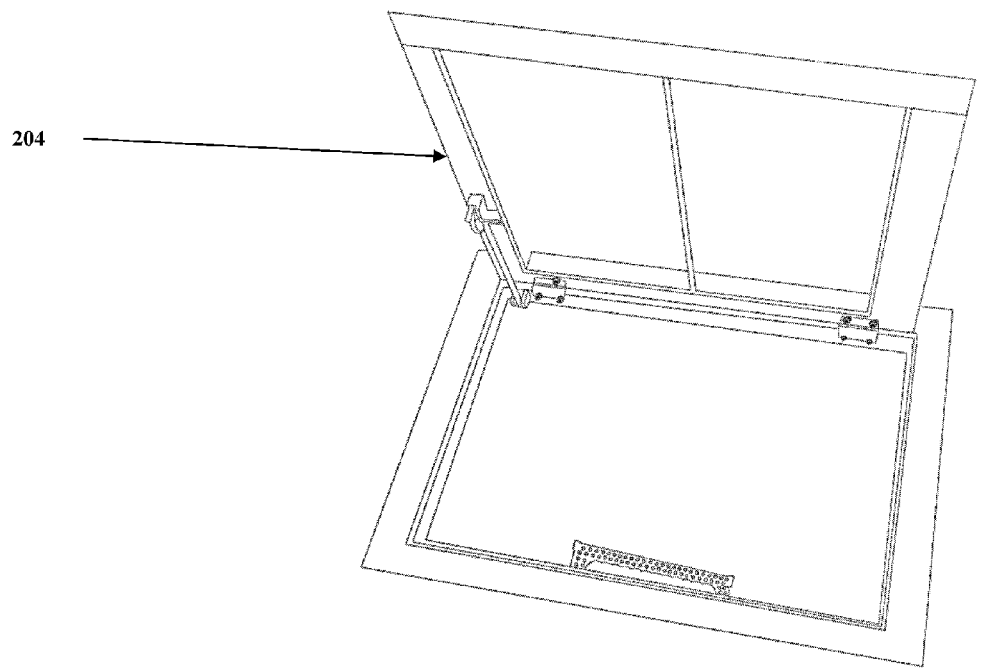
FIG. 4 contains a top isometric view of the representative implementation of the hatch entryway, according to an exemplary embodiment of the invention.
Figure 5:
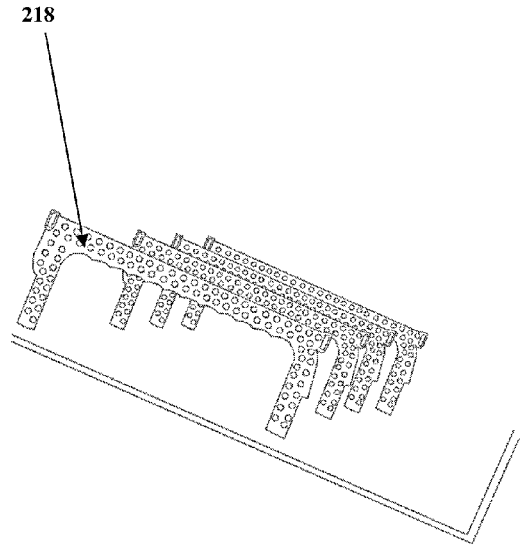
FIG. 5 contains a top view of the representative implementation of the optional steps for the hatch system, according to an exemplary embodiment of the invention.

Referring to FIGS. 3-5, we see that in one embodiment, the critical gap seal 302 (dashed line) between the media 110, and the hatch 202 be zero (through the use of a gasket or some similar sealing material around the external perimeter of the hatch 202, so that the flow of water from the bottom to the top along the hatch's 202 perimeter is stopped along at least one or more portions of the gap seal 302. Placement of the gap seal is only critical in that it must be below the top of the media 110.

In an alternate embodiment, the gap 302 is allowed to be open, but made of a size that is no larger than the normal media 110 spacing gap 304, so that any water flowing along said gap will be subjected to the same effect as that going through any of the media 110 spacing gap 304.

In most cases, such cleaning operation will require the emptying of the fluid within the chamber, although such a hatch may be built wide enough to allow entry into the sub-chamber for an operator equipped with SCUBA or such other respiration equipment.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A method for allowing access to the bottom of a water treatment chamber filled with water filtration media, said method comprising;

entering a hatch formed of an impermeable material, wherein said hatch is shaped to allow travel through it by a human, wherein said hatch extends from above the operational water level of said chamber to a level significantly below the top of said media;

travelling through said opening of dimensions significantly similar to those of said hatch extending through said media into the lower chamber cavity; and cleaning said media from below.

\* \* \* \* \*